United States Patent
van Haag

(10) Patent No.: US 7,182,721 B2
(45) Date of Patent: Feb. 27, 2007

(54) DEFLECTION CONTROLLED ROLL

(75) Inventor: Rolf van Haag, Kerken (DE)

(73) Assignee: Voith Paper Patent GmbH, Heidenheim (DE)

(*) Notice: Subject to any disclaimer, the term of this patent is extended or adjusted under 35 U.S.C. 154(b) by 32 days.

(21) Appl. No.: 10/207,034

(22) Filed: Jul. 30, 2002

(65) Prior Publication Data

US 2004/0087422 A1    May 6, 2004

(30) Foreign Application Priority Data

Jul. 31, 2001    (DE) ................ 101 37 326

(51) Int. Cl.
B25F 5/02    (2006.01)
(52) U.S. Cl. .............................. 492/6; 492/7
(58) Field of Classification Search ........ 492/16, 492/6, 7
See application file for complete search history.

(56) References Cited

U.S. PATENT DOCUMENTS

| | | | |
|---|---|---|---|
| 4,726,691 A * | 2/1988 | Lehmann ................ | 384/99 |
| 4,776,069 A | 10/1988 | Snellman | |
| 4,856,157 A * | 8/1989 | Kusters .................. | 492/7 |
| 4,955,120 A * | 9/1990 | Brendel et al. ........... | 492/7 |
| 4,984,343 A * | 1/1991 | Schrors ................. | 492/7 |
| 4,996,862 A * | 3/1991 | Schrors ................. | 72/245 |
| 5,189,776 A * | 3/1993 | Kusters ................. | 492/7 |
| 5,967,957 A * | 10/1999 | Kusters ................. | 492/7 |
| 6,346,066 B1 | 2/2002 | Kivioja | |
| 6,497,177 B2 * | 12/2002 | Brendel et al. ........... | 100/35 |
| 2002/0010062 A1 | 1/2002 | Holopainen et al. | |
| 2002/0088353 A1 * | 7/2002 | Brendel et al. ........... | 100/35 |

FOREIGN PATENT DOCUMENTS

| | | |
|---|---|---|
| DE | 3909556 | 11/1989 |
| EP | 0328503 | 4/1993 |
| WO | 98/ 17862 | 4/1998 |

OTHER PUBLICATIONS

U.S. Appl. No. 10/200,494, filed Jul. 23, 2002, entitled "Deflection Controlled Roll."
U.S. Appl. No. 10/200,429, filed Jul. 23, 2002, entitled "Deflection Controlled Roll."
English language Abstract of Finnish Patent No. 1 072 87 from the Database WPI.

* cited by examiner

*Primary Examiner*—Marc Jimenez
(74) *Attorney, Agent, or Firm*—Greenblum & Bernstein, P.L.C.

(57) ABSTRACT

Deflection controlled roll that includes a rotating roll jacket, a rotationally fixed yoke arranged to axially pass through the roll jacket, and at least one hydrostatic support element arranged on the yoke to exert a supporting force on an inner side of the roll jacket. The at least one hydrostatic support element includes a pressure space, a hydrostatic pocket, and at least one restrictor or capillary coupled to the at least one hydrostatic pocket. The pressure space is structured and arranged to receive pressure fluid to charge the at least one hydrostatic support element, and the at least one restrictor or capillary is structured and arranged to convey pressure fluid to the at least one hydrostatic pocket. The pressure space and the at least one hydrostatic pocket are structured and arranged to be separately supplied with pressure fluid.

8 Claims, 4 Drawing Sheets

DEFLECTION CONTROLLED ROLL

CROSS-REFERENCE TO RELATED APPLICATIONS

The present application claims priority under 35 U.S.C. § 119 of German Patent Application No. 101 37 326.0 filed Jul. 31, 2001, the disclosure of which is expressly incorporated by reference herein in its entirety.

BACKGROUND OF THE INVENTION

Field of the Invention

The invention relates to a deflection controlled roll having a rotating roll jacket, a rotationally fixed yoke axially passing through the roll jacket, and at least one hydrostatic support element arranged on the yoke to exert a supporting force on the inner side of the roll jacket. The at least one hydrostatic support element is formed by a piston in cylinder unit actuated by pressure fluid and can be charged accordingly via a pressure space, with a respective hydrostatic pocket of the hydrostatic support element being supplied with pressure fluid in each case via at least one restrictor or capillary. Such a roll is described, for example, in EP-B-0 328 503.

In deflection controlled rolls or deflection compensation rolls, support sources or support elements are used which are charged with oil pressure via a supply line. The respective support source is pressed toward the rotating roll jacket by this oil pressure. Since the piston surface of the support source is smaller than the hydrostatic pocket surface facing the roll jacket, a lower pocket oil pressure is adopted. The pressure difference between the piston pressure and the pocket pressure defines the volume flow which flows via the capillaries disposed between the pocket surface and the piston surface. Thus, the respective volume flow is adopted at a support source in dependence on the piston pressure.

The support sources are individually charged with an oil pressure for an individual profile correction, i.e., in particular for the correction of certain transverse property profiles of the goods web, in particular of a paper web or of a cardboard web, running through the roll nip. The level of the oil pressure is regulated via an online profile thickness measurement of the goods web.

Large differences can occur between the oil pressures of the different support sources (e.g. from 3.5 to 90 bar from support source to support source) in dependence on the respectively required profile corrections. As already indicated, this results in volume flow differences at the support sources. Friction occurs between the rotating roll jacket and the support sources due to the oil shear in dependence on the jacket speed and to the oil gap level, which is in turn depending on the volume flow, on the oil temperature and on the pocket pressure. Thus, a friction level results with a different amount from one support source to the other as a consequence of the large pressure differences and is expressed in temperature differences at the roll jacket. These temperature differences in turn have an effect on the shape of the roll jacket and thus also produce a feedback effect which influences the produced path load profile of the deflection controlled roll.

Since a lower volume is adopted with a pressure balance at a support source, a higher temperature results at this support source despite an operationally lower friction level than with higher pressures. A higher temperature now, however, results in an expansion of the roll jacket which is expressed in a path load increase in the roll nip. Therefore, the temperature development is expressed in the reverse direction to the desired pressure balance and, thus, is unwanted. In individual cases, this can even result in instability in the control behavior.

Usually, the temperature development at the support sources is limited by a separate cooling oil flow which is led into the inner space of the roll. For this purpose, a volume flow of lower temperature is distributed in the inner space of the roll via a nozzle, the amount of said volume flow being controlled via the return temperature of the roll. Up to now, the same amount of cooling oil is supplied to each support source by such a distribution. However, as a consequence of the previously named volume flow differences, different temperatures are adopted at the support sources despite the supplied cooling oil amount. This state of affairs is documented by the following calculation example:

The present calculation example is a deflection compensation roll of a thickness calender, with the production speed amounting to 1540 m/min. The surface temperature of the roll is, in this case, equal to the return temperature so that no heat flow flows through the jacket.

The technical data relevant to the calculation are as follows:

| | |
|---|---|
| outer diameter: | 1016 mm |
| inner diameter: | 780 mm |
| support source size: | 70 mm piston diameter |
| oil viscosity: | ISO VG 68 (mineral oil) |
| inlet temperature: | 40° C. for all flows (support source and cooling oil). |

The temperature development and the friction level of a support source were examined in the calculation for a minimum (3.5 bar) and a maximum (90 bar) piston pressure in dependence on the cooling flow.

FIG. 1 shows a diagram in which the respective oil temperature resulting after a support source is shown over the secondary flow, i.e., the cooling flow, for the minimum and the maximum piston pressure of 3.5 bar and 90 bar respectively. In this connection, the temperature is given in ° C. and the secondary flow in ltr./min. The oil temperature shown was determined directly in the outlet in the direction of jacket rotation behind the support source.

In the inlet of the support source, oil is taken in underneath the support source with the running of the roll jacket at a mixing temperature which results from the injection of the cooling oil into the interior of the roll.

It can be recognized from FIG. 1 that the oil temperatures are much higher for all examined cooling oil flows at a piston pressure of 3.5 bar than at a piston pressure of 90 bar.

The mixing temperature adopted at the interior of the roll approximately corresponds to the local return temperature. FIG. 2 shows a diagram in which the calculated return temperature is entered over the cooling flow (secondary flow) in each case for the two different piston pressures. In this connection, it must be noted that in each only one support source was examined in the calculation, i.e. a mixing of the oil from a plurality of support sources with different oil pressures and thus different temperatures remain unconsidered.

The adopted local return temperatures show an increasing temperature difference between a support source with a high load and a support source with a low load as the cooling

SUMMARY OF THE INVENTION

The present invention provides an improved deflection controlled roll of the kind initially mentioned in which the above-mentioned problems have been eliminated.

In accordance with the invention, a respective hydrostatic pocket is supplied with a constant volume flow of pressure fluid separately from the pressure space of the hydrostatic support element.

The initially described temperature effect reverses due to this design. Small fluid gap levels are thus now adopted at a support element charged with higher pressures, whereas larger fluid gap levels result at a support element charged with lower pressures. As pressures become increasingly higher and as a load of a respective support element becomes correspondingly larger, the friction level thus increases accordingly. As pressures become increasingly smaller and as a load of a respective support element becomes correspondingly smaller, the friction level becomes correspondingly lower. As a result, at higher pressures and at a correspondingly higher load of a respective support element, this leads to a correspondingly higher mixing temperature at the interior of the roll and vice versa.

However, a reversal of the above-described temperature effect which influences the path load distribution is also brought about. For instance, at those positions at which a high pressure is wanted, the corresponding effect is now supported by the thermally induced roll expansion. Thermally reduced relief results from the roll shape at those positions at which, for example, a desired pressure relief is pre-set via a corresponding control. The temperature effect which occurs therefore respectively supports the already provided control or regulation.

If the support element has a plurality of hydrostatic pockets, each of these hydrostatic pockets is preferably supplied with a constant volume flow of pressure fluid respectively separate from the pressure space of the hydrostatic support element.

A preferred practical embodiment of the deflection controlled roll in accordance with the invention includes a plurality of support elements which are arranged in series on the yoke at least in one row in the direction of the roll axis and in that the hydrostatic pockets of all support elements are supplied with a constant volume flow of pressure fluid respectively separate from the pressure space of the respective hydrostatic support element.

The respective hydrostatic pockets are expediently supplied with pressure oil. A respective hydrostatic pocket is thus supplied with a constant volume flow of pressure oil.

In accordance with another variant of the invention, the respective hydrostatic pocket of the hydrostatic support element is charged with a constant fluid pressure via at least one pre-restrictor. Therefore, the constant fluid pressure is applied at the end of the pre-restrictor remote from the hydrostatic pocket.

As a result of this design, the thermally supported effect has an even greater effect on the path load. In this case, the volume flow of a pressure fluid supplied to a respective hydrostatic pocket decreases as the pressure in the pressure space increases and correspondingly as the load of the respective support element increases, since a higher pocket pressure is correspondingly adopted at a support element charged with high piston pressure, whereby the pressure difference at the pre-restrictor becomes smaller. The volume flow of the pressure fluid supplied to the respective hydrostatic pocket correspondingly becomes lower. In contrast, with smaller piston pressures and correspondingly smaller pocket pressures, correspondingly larger pressure differences result at the respective pre-restrictor so that correspondingly larger volume flows result.

The respective pre-restrictor can in particular be in turn provided at the interior of the relevant support element.

The pre-restrictor is expediently connected to a passage separate from the pressure space and conducting the fluid of constant pressure at its end remote from the hydrostatic pocket. In this respect, a respective passage can, for example, also be associated with a plurality of pre-restrictors.

If the respective support element has a plurality of hydrostatic pockets, then each of these hydrostatic pockets is preferably respectively charged with a constant fluid pressure via at lest one pre-restrictor.

An expedient practical embodiment of the deflection controlled roll in accordance with the invention is characterized in that a plurality of support elements are provided which are arranged in series at the yoke at least in one row in the direction of the roll axis and in that the hydrostatic pockets of all support elements are each charged with a constant fluid pressure via at least one pre-restrictor.

The respective hydrostatic pockets are preferably supplied with pressure oil. A respective pre-restrictor can thus in particular be charged with a constant oil pressure.

The present invention is directed to a deflection controlled roll that includes a rotating roll jacket, a rotationally fixed yoke arranged to axially pass through the roll jacket, and at least one hydrostatic support element arranged on the yoke to exert a supporting force on an inner side of the roll jacket. The at least one hydrostatic support element includes a pressure space, a hydrostatic pocket, and at least one restrictor or capillary coupled to the at least one hydrostatic pocket. The pressure space is structured and arranged to receive pressure fluid to charge the at least one hydrostatic support element, and the at least one restrictor or capillary is structured and arranged to convey pressure fluid to the at least one hydrostatic pocket. The pressure space and the at least one hydrostatic pocket are structured and arranged to be separately supplied with pressure fluid.

In accordance with a feature of the instant invention the at least one hydrostatic support element can include a piston in cylinder unit.

According to another feature of the invention, a respective hydrostatic pocket maybe supplied with a constant volume flow of pressure fluid separately from the pressure space.

The at least one hydrostatic support element can include a plurality of hydrostatic pockets and each of the plurality of hydrostatic pockets can be supplied with a constant volume flow of pressure fluid separately from the pressure space.

Further, the at least one hydrostatic support element may include a plurality of support elements arranged in series on the yoke in a direction of a roll axis. The at least one hydrostatic pocket of each of the plurality of support elements can be supplied with a constant volume flow of pressure fluid case separately from the pressure space.

According to another feature, the pressure fluid supplied to the at least one hydrostatic pocket is pressure oil.

The present invention is directed to a deflection controlled roll that includes a rotating roll jacket, a rotationally fixed yoke arranged to axially pass through the roll jacket, at least one hydrostatic support element is arranged on the yoke to exert a supporting force on an inner side of the roll jacket.

The at least one hydrostatic support element includes a pressure space, a hydrostatic pocket, and at least one pre-restrictor coupled to the at least one hydrostatic pocket. The pressure space can be structured and arranged to receive pressure fluid to charge the at least one hydrostatic support element, and the at least one pre-restrictor may be structured and arranged to convey pressure fluid at a constant fluid pressure to the at least one hydrostatic pocket.

According to a feature of the present invention, the at least one hydrostatic support element can include a piston in cylinder unit.

In accordance with another feature of the invention, the pre-restrictor may be located within the at least one hydrostatic support element.

An end of the pre-restrictor remote from the at least one hydrostatic pocket can be coupled to a passage separate from the pressure space.

The passage may be structured and arranged to conducting pressure fluid at a constant pressure.

According to another feature of the present invention, the at least one hydrostatic pocket may include a plurality of hydrostatic pockets and each of the plurality of hydrostatic pockets can be coupled to a pre-restrictor to be charged with a constant fluid pressure.

Moreover, the at least one hydrostatic support element may include a plurality of support elements arranged in series on the yoke in a direction of a roll axis. The at least one hydrostatic pocket of each of the plurality of support elements can be supplied with pressure fluid at a constant fluid pressure separately from the pressure space.

The present invention is directed to a process of operating a deflection controlled roll that includes a rotating roll jacket, a rotationally fixed yoke arranged to axially pass through the roll jacket, and at least one hydrostatic support element arranged on the yoke to exert a supporting force on an inner side of the roll jacket. The at least one hydrostatic support element includes a pressure space, a hydrostatic pocket, and at least one restrictor or capillary coupled to the at least one hydrostatic pocket. The process includes supplying pressure fluid to the pressure space to charge the at least one hydrostatic support element, and separately supplying pressure fluid to the at least one hydrostatic pocket through the at least one restrictor or capillary.

According to another feature of the instant invention, the at least one hydrostatic pocket can be supplied with a constant volume flow of pressure fluid through the at least one restrictor or capillary.

The present invention is directed to a process of operating a deflection controlled roll that includes a rotating roll jacket, a rotationally fixed yoke arranged to axially pass through the roll jacket, and at least one hydrostatic support element is arranged on the yoke to exert a supporting force on an inner side of the roll jacket. The at least one hydrostatic support element includes a pressure space, a hydrostatic pocket, and at least one pre-restrictor coupled to the at least one hydrostatic pocket. The process includes supplying a pressure fluid to the pressure space to charge the at least one hydrostatic support element, and supplying a pressure fluid at a constant fluid pressure to the at least one hydrostatic pocket through the at least one pre-restrictor.

In accordance with yet another feature of the instant invention, the pressure fluid to the at least one pre-restrictor can be supplied separately from the pressure fluid to the pressure space.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention, the description taken with the drawings making apparent to those skilled in the art how the several forms of the present invention may be embodied in practice.

Figure 1:
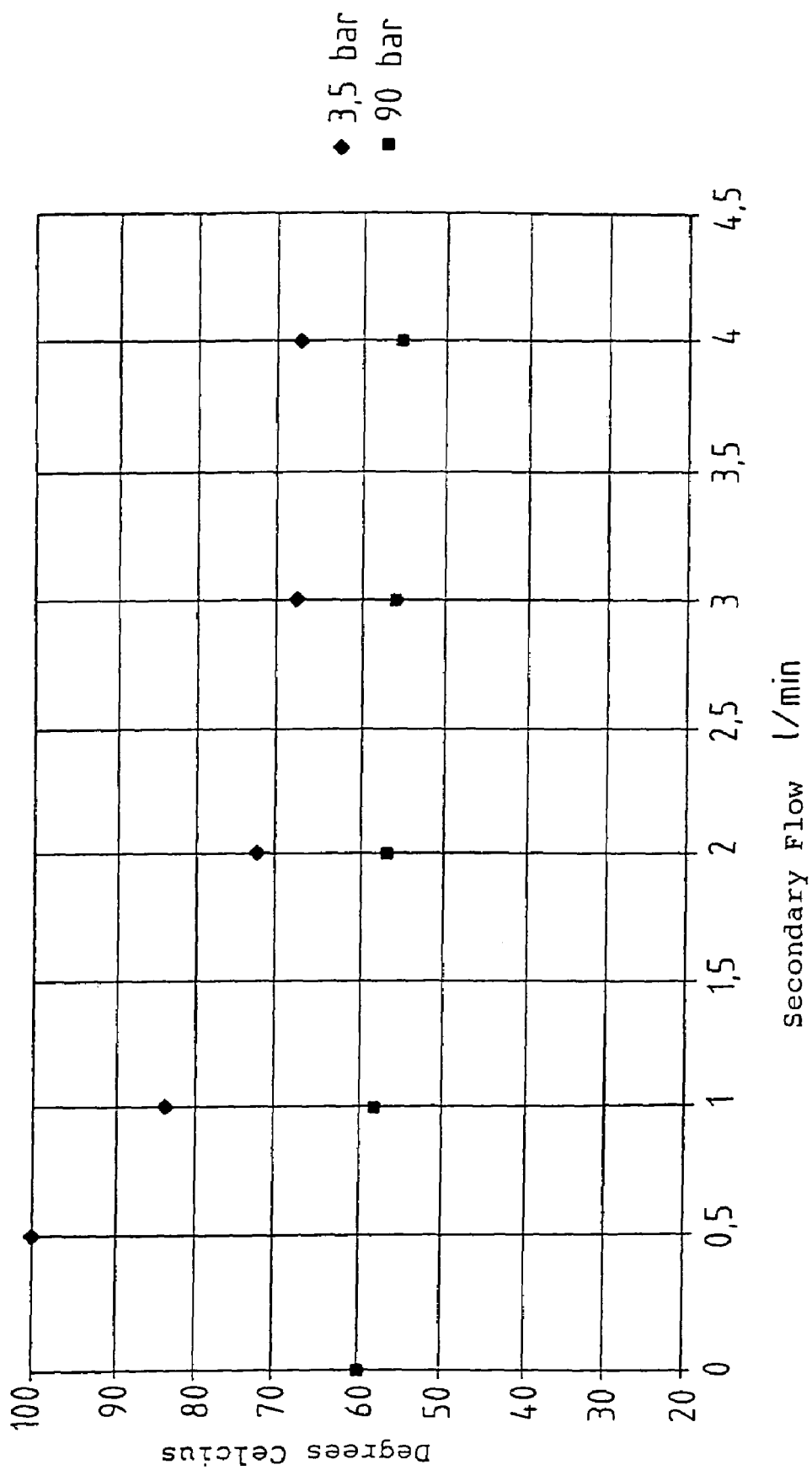
FIG. 1 illustrates the respective oil temperature resulting after a support source is shown for two different piston pressures over the cooling oil flow (secondary flow)
Figure 2:
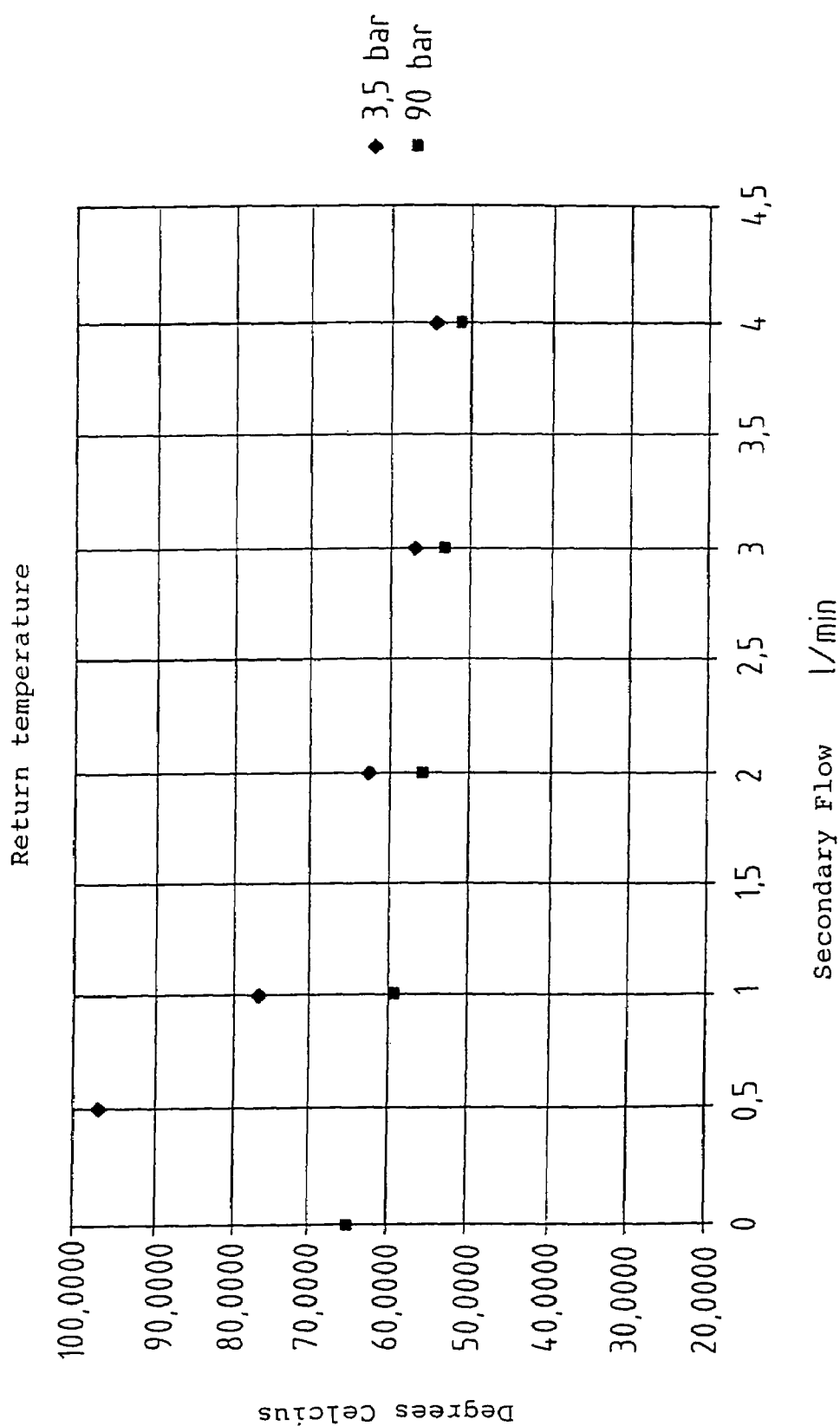
FIG. 2 illustrates the respective calculated return temperature is shown for two different piston pressures over the cooling oil flow (secondary flow)
Figure 3:
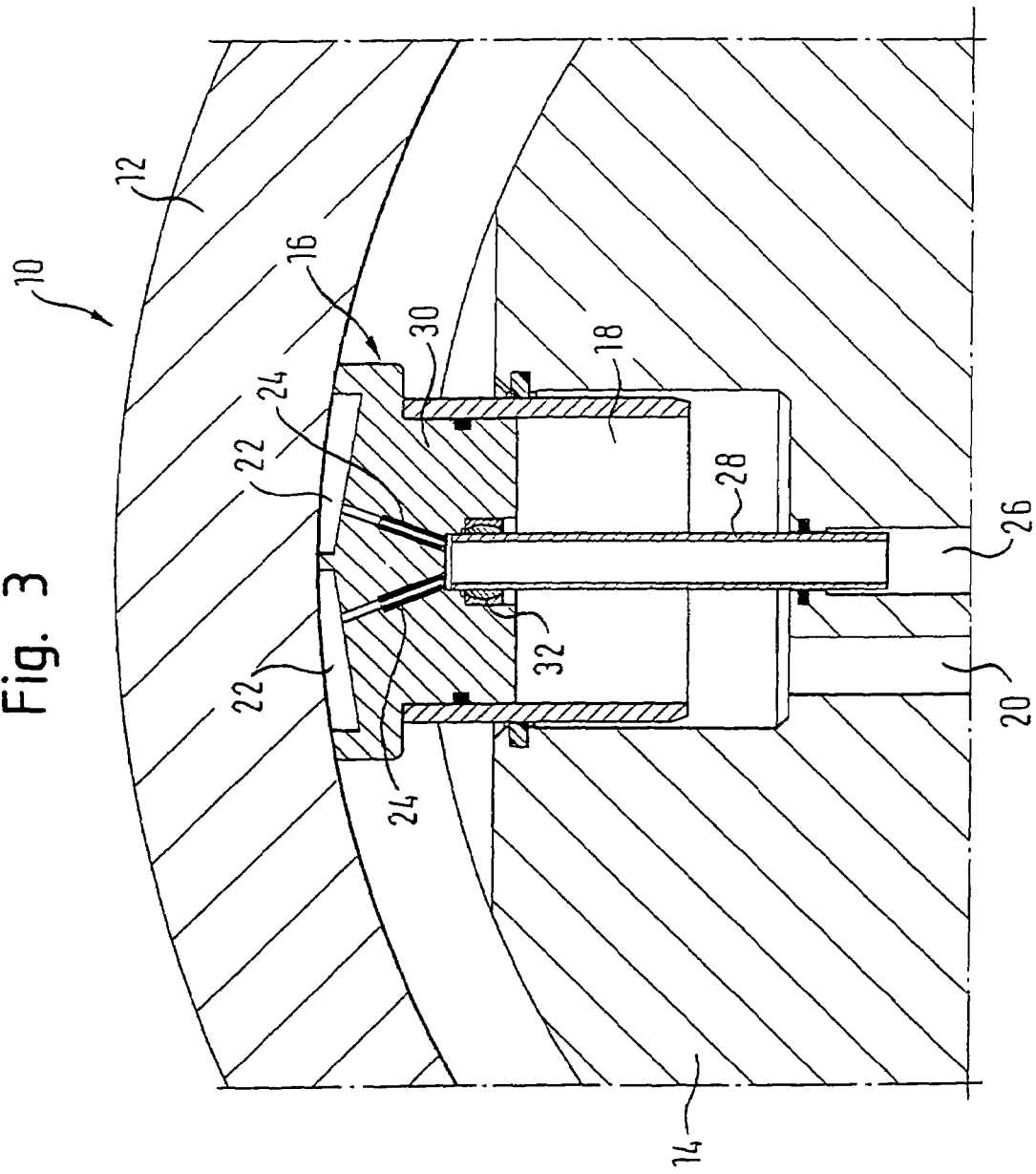
FIG. 3 schematically illustrates a sectioned representation of an exemplary embodiment of a deflection controlled roll in accordance with the invention.

FIG. 3 shows, in a schematic sectioned part representation, an exemplary embodiment of a first variant of a deflection controlled roll 10 in accordance with the invention which can serve for the treatment of a material web such as in particular of a paper web or of a cardboard web in a nip (not shown) formed with a counter surface.

Deflection controlled roll 10 includes a rotating roll jacket 12, a rotationally fixed yoke 14 axially passing through roll jacket 12 and a plurality of support elements 16 which are arranged in series on yoke 14 in the direction of the roll axis and of which only one can be recognized in FIG. 3.

Support elements 16 are each formed by a piston in cylinder unit actuated by pressure fluid and exerting a respective supporting force on the inner side of roll jacket 12.

Support elements 16 can be controlled individually and/or group-wise, whereby corresponding roll zones succeeding one another in the direction of the roll axis result.

Pressure space 18 of a respective support element 16 can be charged with pressure fluid via a passage 20 provided in yoke 14.

As can be recognized with reference to FIG. 3, a respective support element 16 has a plurality of hydrostatic pockets 22, e.g. four such pockets.

In the present case, hydrostatic pockets 22 are supplied with a constant volume flow of pressure fluid, i.e. in particular pressure oil, separately from pressure space 18 of respective hydrostatic support element 16. For this purpose, pressure fluid is supplied to these hydrostatic pockets 22 via restrictors or capillaries 24 provided in support element 16 by a passage 26 separate from pressure space 18 and from passage 20. Passage 26, which like passage 20 is provided in yoke 14, can be connected, for example, to restrictors 24 and/or to a space in piston 30 of support element 16 disposed in front of restrictors 24 and common to different restrictors 24 via a pipe section 28 or the like passing through pressure space 18. As can be recognized from FIG. 3, the end of pipe section 28 at the piston side is mounted in piston 30 via a pivot bearing 32 such that tube section 28 can be pivoted within certain limits with respect to the piston 30 in order to in particular compensate corresponding piston movements.

If a plurality of support elements 16 are provided which are arranged in series on yoke 14 at least in one row in the direction of the roll axis, hydrostatic pockets 22 of all support elements 16 are preferably supplied with a constant volume flow of pressure fluid or pressure oil in each case separately from pressure space 18 of the respective support element 16.

In this embodiment, the temperature effect initially described reverses. Lower oil gap levels thus result with support elements 16 charged with a higher piston pressure and larger oil gap levels with support elements 16 charged with a lower piston pressure. Accordingly, the friction level increases as pressures in pressure space 18 of a respective support element 16 become higher, whereas it falls with lower pressures, i.e., with a lower charge of respective support element 16. Accordingly, higher piston pressures or higher loads of support elements 16 result in a higher mixing temperature at support elements 16, whereas a respective pressure relief correspondingly brings about a lower mixing temperature. The initially mentioned temperature effect, which influences the path load distribution, therefore acts in reverse. At those positions at which a high pressure is desired, for instance, the effect caused by a corresponding pressure charge of respective support elements 16 is supported by the thermally induced roll expansion. Correspondingly, at those positions at which, for example, a pressure relief is desired via the corresponding control or regulation, such a pressure relief is supported by a thermally induced relief via the roll shape.

Figure 4:
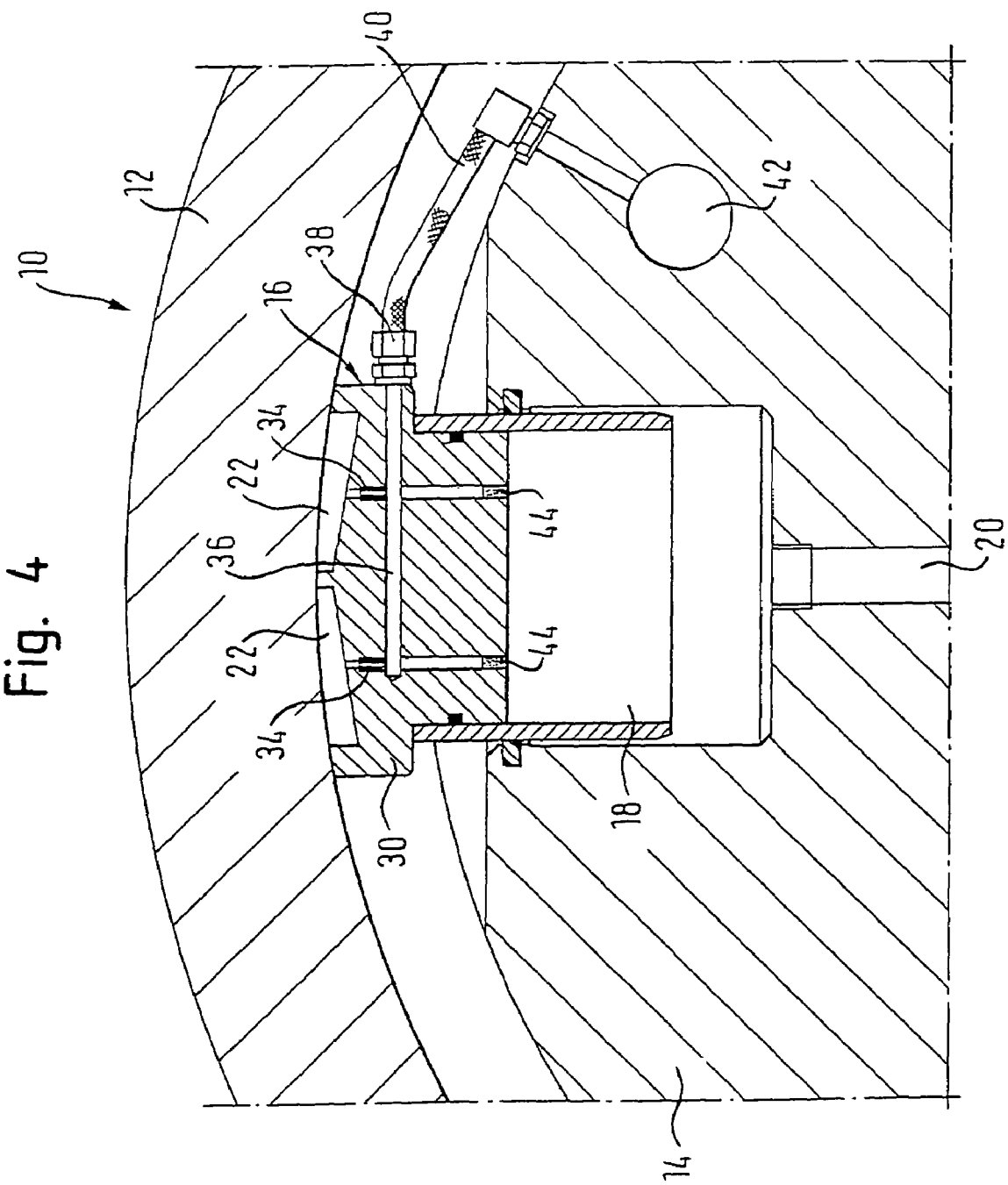
FIG. 4 schematically illustrates a sectioned representation of an other exemplary embodiment of the deflection controlled roll in accordance with the invention.

FIG. 4 shows in a schematic sectioned part representation an exemplary embodiment of a second variant of a deflection controlled roll 10 in accordance with the invention. Deflection controlled roll 10 can, for example, also again serve for the treatment of a material web such as in particular of a paper web or of a cardboard web in a nip (not shown) formed with a counter surface. It again includes a rotating roll jacket 12, a rotationally fixed yoke 14 axially passing through roll jacket 12 and a plurality of hydrostatic support elements 16 which are arranged in series on yoke 14 in the direction of the roll axis and of which again only one can be recognized in FIG. 4.

Support elements 16 are again respectively formed by a piston in cylinder unit actuated by pressure fluid and exerting a respective supporting force on the inner side of roll jacket 12. Moreover, the support elements can also again be controlled individually and/or group-wise, whereby corresponding roll zones result which succeed one another in the direction of the roll axis.

Pressure space 18 of a respective support element 16 can again also be charged with pressure fluid via a passage 20 provided in yoke 14.

Finally, support elements 16 are respectively again also provided with a plurality of, e.g. four, hydrostatic pockets 22.

In the present case, hydrostatic pockets 22 of a respective hydrostatic support element 16 are respectively charged with a constant fluid pressure, i.e., in particular a constant oil pressure, via at least one pre-restrictor 34. For this purpose, pre-restrictors 34 provided at the interior of a respective support element 16 are connected at their ends remote from respective hydrostatic pocket 22 to a passage 36 separate from pressure space 18 and conducting the fluid or the oil of constant pressure. Passage 36, provided like pre-restrictors 34 in piston 30 of relevant support element 16, is connected via a connection 38 provided at the outside at piston 30 to a line 40 via which pressure fluid or pressure oil is supplied from a passage 42 in yoke 14 which is separate from pressure space 18 and from passage 20 to passage 36 in piston 30 serving for the fluid distribution to the different pre-restrictors 34.

A constant fluid pressure or oil pressure is thus respectively applied at the ends of pre-restrictors 34 remote from hydrostatic pockets 22.

A common passage 36 can be provided for the different hydrostatic pockets 22 of a respective support element 12.

With a plurality of support elements 16 provided at least in one row in series on yoke 14 in the direction of the roll axis, hydrostatic pockets 22 of all support elements 16 are preferably respectively charged with a constant fluid pressure or oil pressure via at least one pre-restrictor 34 in the manner described.

As can be recognized with reference to FIG. 4, the bores for pre-restrictors 34 were made, for production technical reasons, as through going bores. These bores are sealed off toward the pressure space 18 by seals 44.

With such a design, the supporting effect of the thermal effect on the adjustment of a respective path load distribution is further increased. The volume flow of pressure fluid or pressure oil supplied to hydrostatic pockets 22 of a respective support element 16 thus falls as the piston pressure increases, i.e. as the load of the respective support element increases, since a correspondingly high pocket pressure is adopted with a support element 16 charged with a high piston pressure and, accordingly, a correspondingly lower pressure difference results at pre-restrictors 34. A correspondingly smaller volume flow results with a smaller pressure difference. As the piston pressure becomes increasingly smaller and as the pocket pressure of a respective support element 16 becomes correspondingly smaller, a larger pressure difference is correspondingly adopted at pre-restrictors 34, which brings about a correspondingly larger volume flow.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

REFERENCE NUMERAL LIST

10 deflection controlled roll
12 roll jacket
14 yoke
16 support element 18 pressure space
20 passage
22 hydrostatic pocket
24 restrictor, capillary
26 passage
28 tube section
30 piston
32 pivot bearing
34 pre-restrictor
36 passage
38 connection
40 fluid line or oil line
42 passage
44 seal

What is claimed:

1. A deflection controlled roll comprising:
   a rotating roll jacket;
   a rotationally fixed yoke arranged to axially pass through said roll jacket;
   hydrostatic support elements arranged on said yoke to exert a supporting force on an inner side of said roll jacket;
   said hydrostatic support elements respectively comprising a pressure space, at least one hydrostatic pocket, and at least one of a restrictor and capillary coupled to the at least one hydrostatic pocket;
   the pressure spaces being structured and arranged to receive pressure fluid to charge the hydrostatic support elements;
   a control device to set a path load distribution via piston pressures of the hydrostatic support elements and to charge the at least one hydrostatic pockets with constant fluid through the at least one restrictors and capillary.

2. The deflection controlled roll according to claim 1, wherein the restrictor is arranged inside the support element.

3. The deflection controlled roll according to claim 1, wherein the restrictors, at ends remote from the at least one hydrostatic pockets, are connected to a passage, separate from the pressure space, conducting fluid of a constant pressure.

4. The deflection controlled roll according to claim 3, wherein the passage comprise a tube connected to the at least one hydrostatic support element to convey the pressure fluid to the at least one restrictor or capillary.

5. The deflection controlled roll according to claim 1, wherein the at least one hydrostatic pocket comprises a plurality of hydrostatic pockets, and each of the plurality of hydrostatic pockets is charged with a constant fluid pressure via at least one restrictor.

6. The deflection controlled roll according to claim 1, wherein the support elements are arranged in series on the yoke at least in one row in the direction of the roll axis, and each at least one hydrostatic pocket of the support elements is each charged with a constant fluid pressure via the at least one restrictor.

7. The deflection controlled roll according to claim 1, wherein the hydrostatic pocket is supplied with pressure oil.

8. A pressing apparatus for treatment of a paper or cardboard web comprising the deflection controlled roll according to claim 1, and a mating surface arranged to form a gap with the deflection controlled roll.

* * * * *